United States Patent [19]
Son

[11] Patent Number: 5,745,472
[45] Date of Patent: Apr. 28, 1998

[54] VIBRATION ATTENUATION APPARATUS OF OPTICAL DISC PLAYER

[75] Inventor: Jin-Seung Son, Seoul, Rep. of Korea

[73] Assignee: Samsung Electronics Co., Ltd., Suwon, Rep. of Korea

[21] Appl. No.: 851,491

[22] Filed: May 5, 1997

Related U.S. Application Data

[63] Continuation of Ser. No. 650,771, May 20, 1996, abandoned, which is a continuation of Ser. No. 293,952, Aug. 24, 1994, abandoned.

[30] Foreign Application Priority Data

Aug. 24, 1993 [KR] Rep. of Korea ............... 93-16456
Jan. 31, 1994 [KR] Rep. of Korea ............... 94-1765

[51] Int. Cl.$^6$ .............................................. G11B 23/00
[52] U.S. Cl. .............................................. 369/263
[58] Field of Search .............................. 369/263, 246, 369/247, 248, 219

[56] References Cited

U.S. PATENT DOCUMENTS 4,253,126  2/1981  Kuribayashi et al. ................ 369/219

FOREIGN PATENT DOCUMENTS

62-288739  12/1987  Japan.
2-57741   2/1990   Japan.

*Primary Examiner*—Jefferson Evans
*Assistant Examiner*—Allen Cao
*Attorney, Agent, or Firm*—Burns, Doane, Swecker & Mathis, L.L.P.

[57] ABSTRACT

An optical disc player is mounted to a frame by a vibration damping mechanism filled with a mixture of silicone oil and silica. The silicone oil has a viscosity in the range of 50,000 to 250,000 centistokes, and is 95 to 70% of the mixture weight. The silica has a viscosity in the range of 50,000 to 150,000 centistokes and is 5 to 30% of the mixture weight.

1 Claim, 8 Drawing Sheets

TRANSFER RATE OF DAMPER FILLED WITH SILICON OIL AND SILICA (VISCOSITY : 100,000 CS)

TRANSFER RATE OF DAMPER FILLED
WITH SILICON OIL AND SILICA
(VISCOSITY : 100,000 CS)

FIG. 3B

TRANSFER RATE OF DAMPER FILLED
WITH SILICON OIL AND SILICA
(VISCOSITY : 500,000 CS)

FIG. 3C

TRANSFER RATE OF DAMPER FILLED
WITH SILICON OIL AND SILICA
(VISCOSITY : 1,000,000 CS)

FIG. 4A

TRANSFER RATE OF DAMPER FILLED WITH
SILICON OIL AND SYNTHETIC HYDRATED SILICA
(VISCOSITY : 100,000 CS)

FIG. 4B

TRANSFER RATE ACCORDING TO CHANGE OF VISCOSITY
(SYNTHETIC HYDRATED SILICA 15%)

FIG. 4C

TRANSFER RATE ACCORDING TO CHANGE OF VISCOSITY
(SYNTHETIC HYDRATED SILICA 15%)

FIG. 4D

TRANSFER RATE OF DAMPER FILLED WITH
SILICON OIL AND SYNTHETIC HYDRATED SILICA
(VISCOSITY : 500,000 CS)

VIBRATION ATTENUATION APPARATUS OF OPTICAL DISC PLAYER

This application is a continuation of application Ser. No. 08/650,771, filed May 20, 1996, now abandoned, which is a Continuation of U.S. Ser. No. 08/293,952 filed Aug. 24, 1994, now abandoned.

BACKGROUND OF THE INVENTION

1. Field of the Invention

The present invention relates to an optical disc player, and more particularly to a vibration attenuation apparatus of an optical disc player which can reduce a vibration transfer rate in a resonance band to thereby output a fine sound in an optical disc player mounted in an apparatus such as an automobile where there is a vibration.

2. Description of the Prior Art

As a prior art, Japanese Patent International laid-open No. Wo 85/04749 entitled, "optical disc player" is disclosed.

According to the Japanese laid open patent No. Wo 85/04749, a player body having a chassis attached having an optical pickup, disc table or the like is supported to a frame by way of a resilient support member such as coil spring and the like, and at the same time, a vessel unit filled with viscous fluid is connected to the frame. A floating member projects into the vessel unit, so that vibration from the outside can be attenuated by a resistance generated between the viscous fluid and the floating member disposed within the viscous fluid.

Figure 1:
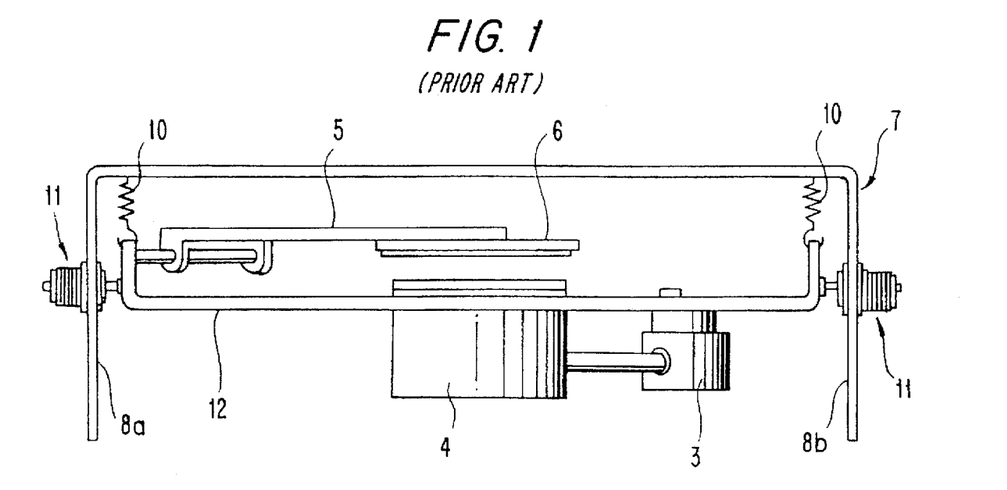
FIG. 1 is a front sectional view of an optical disc player according to the prior art.

In other words, as illustrated in FIG. 1, the player body having a chassis having a pickup 3, a spindle motor 4, a chuck arm 5, a disc chuck 6 and the like is supported to a frame 7 fastened to an external case (not shown) by way of a coil spring 10, and a damper 11 filled with the viscous fluid is disposed between side panel units 8a and 8b of the frame 7 and the chassis 12 to thereby attenuate the vibration from the outside.

Figure 2:
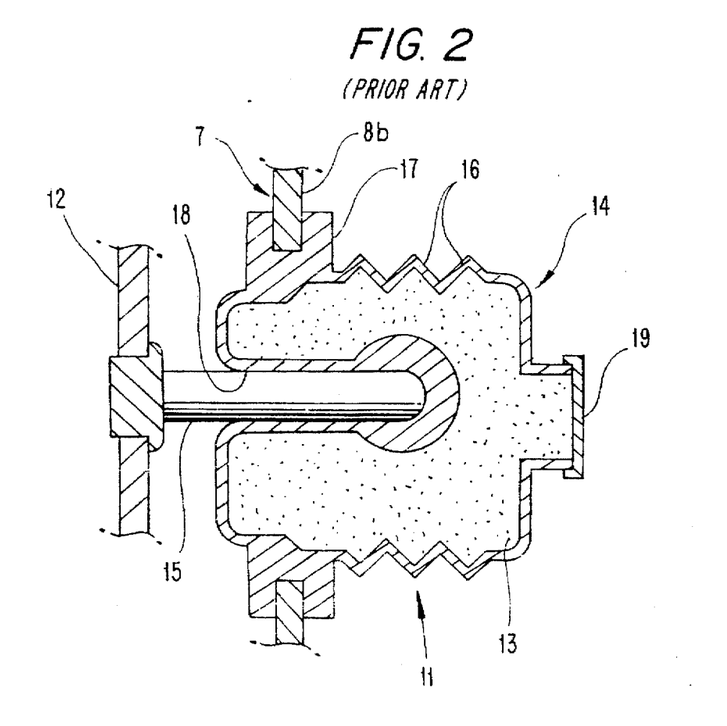
FIG. 2 is a sectional view of a damper in FIG. 1.

FIG. 2 is a sectional drawing for illustrating a structure of the damper 11 shown in FIG. 1, wherein the side panel unit 8b of the frame to which the external case (not shown) is fastened is connected to a flange unit 17 of a vessel 14, and a floating arm 15 combined with the chassis 12 is inserted into a fastening hole 18 of the vessel 14.

The vessel 14 is disposed with a curvature unit 16 and a rear lid 19.

Meanwhile, the vessel 14 is filled with a viscous fluid such as silicone oil 13.

However, in the prior art vessel 14, room for improvement in vibration attenuation exists because the Quality Factor Q is small to thereby minimize sound loss, but it is impossible to reduce the Q value in the resonance band.

SUMMARY OF THE INVENTION

The present invention has been made in view of the above-described problem occurring in the prior art and an object of the invention is to provide a vibration attenuation apparatus of an optical disc player which can reduce a quality factor in the resonance band to thereby output a fine sound.

In accordance with the present invention, the above object can be accomplished by providing a vibration attenuation apparatus of an optical disc player comprising: a damper, which is interposed between a frame attached to an outside case and a chassis fastened the frame and a body, is filled with viscous fluid, said viscous fluid is a mixture of silicone oil and a powder.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT OF THE INVENTION

The present invention of a damper, which is filled with a viscous fluid so that fine sound is outputted to thereby reduce the Q value in a resonance band.

Embodiment No. 1

In a vibration attenuation apparatus of an optical disc player according to a first embodiment, the damper is filled with silicone oil and silica $SiO_2$ serving as the viscous fluid. The silica is mixed with the silicone oil so that the vibration transfer rate is reduced, the viscosity being 100,000 CS (centi stokes). The viscosity of the silicone oil is 50,000–150,000 cs.

First Experiment

A viscosity of the silicone oil is 100,000 CS, a mixing ratio between silicone oil and silica is from 100-70 weight % for silicon oil to 0–30 weight % for silica.

That is, viscosity of silicone oil is 100,000 CS, and the mixing ratio of silica is successively 0 weight %, 20 weight %, and 30 weight %.

As a result of that, it is apparent that the peak value of the vibration transfer rate in case of using a silicone oil and silica mixture is lower than that in case of using only silicone oil as listed in table 1.

TABLE 1

| viscosity of silicone oil (CS) | mixing ratio of silica (%) | frequency at peak value (Hz) | peak value of vibration transfer rate | frequency of vibration transfer rate of 1 (Hz) | vibration transfer rate at 100 Hz |
|---|---|---|---|---|---|
| 100,000 | 0 | 10 | 1.81 | 15.5 | 0.04 |
| 100,000 | 20 | 10 | 1.74 | 16 | 0.04 |
| 100,000 | 30 | 9.5 | 1.66 | 14.5 | 0.04 |

Figure 3A:
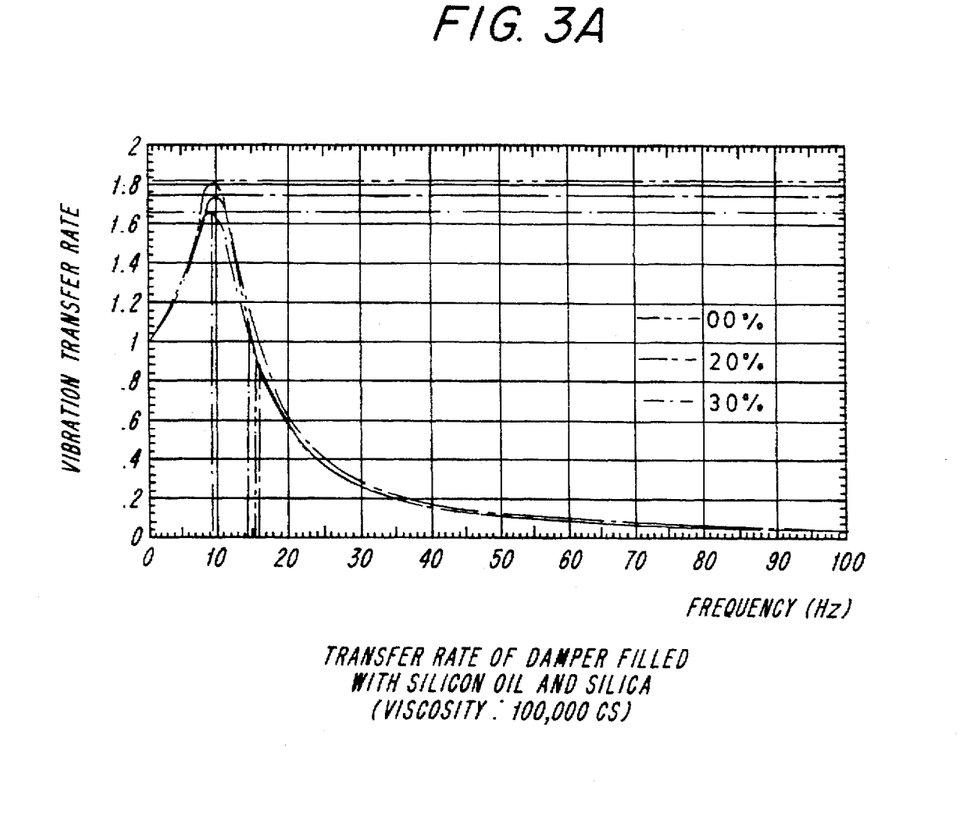
FIGS. 3A to 3C are graphs illustrating the relationship between a frequency and a vibration transfer rate according to an embodiment of the present invention.

FIG. 3A is a graph according to the result of the above experiment.

Second Experiment

To a second experiment, the viscosity of silicone oil is 500,000 CS, the mixing ratio of silicone oil and silica is 100-70 weight % to 0–30 weight %. The mixing ratio of silica is successively 0 weight %, 10 weight %, 20 weight % and 30 weight %.

As a result of that, it is apparent the peak value of the vibration transfer rate in case of silicone oil and silica in the damper is equal to or is higher than that in case of only silicone oil in the damper, as listed in table 2.

TABLE 2

| viscosity of silicone oil (CS) | mixing ratio of silica (%) | frequency at peak value (Hz) | peak value of vibration transfer rate | frequency of vibration transfer rate of 1 (Hz) | vibration transfer rate at 100 Hz |
|---|---|---|---|---|---|
| 500,000 | 0 | 13.5 | 1.95 | 18.5 | 0.04 |
| 500,000 | 10 | 12.5 | 1.95 | 19 | 0.04 |
| 500,000 | 20 | 12.5 | 2.1 | 18.5 | 0.04 |
| 500,000 | 30 | 12.5 | 2.0 | 18.5 | 0.04 |

Figure 3B:
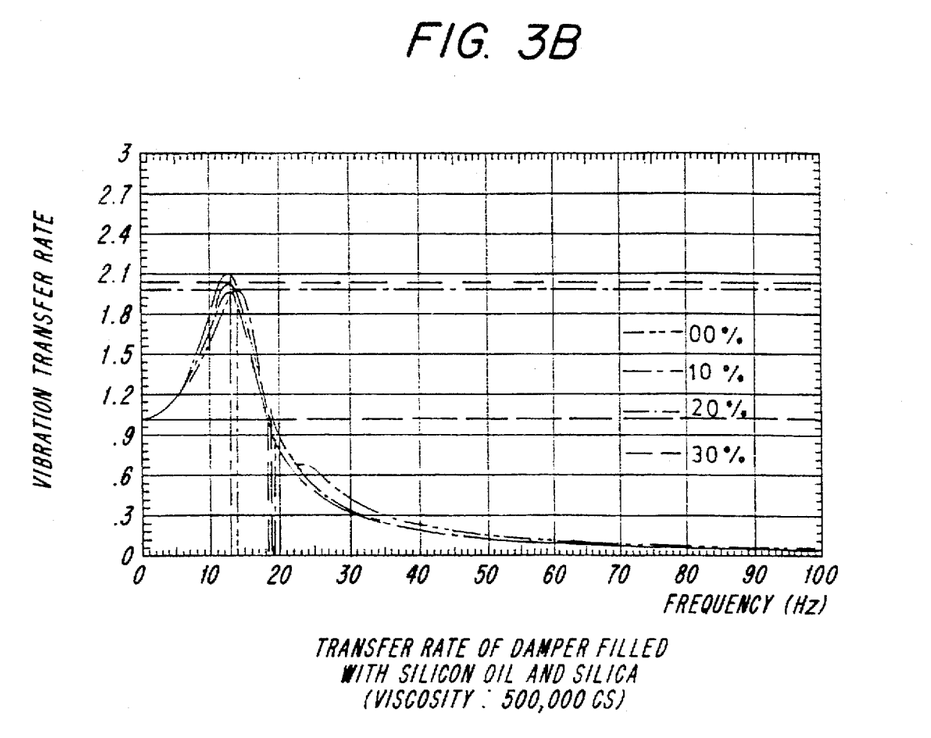

FIG. 3B is a graph according to the result of the above experiment.

Third Experiment

Next, the viscosity of silicone oil is 1,000,000 CS, and the mixing ratio of silica successively 0 weight % and 10 weight %.

As a result of that, it is apparent that peak value of the vibration transfer rate in case of silicone oil and silicone mixture in the damper is equal to that in case of only silicone oil in the damper, as listed in table 3.

TABLE 3

| viscosity of silicone oil (CS) | mixing ratio of silica (%) | frequency at peak value (Hz) | peak value of vibration transfer rate | frequency of vibration transfer rate of 1 (Hz) | vibration transfer rate at 100 Hz |
|---|---|---|---|---|---|
| 1,000,000 | 0 | 14.5 | 2.05 | 21.5 | 0.06 |
| 1,000,000 | 10 | 16 | 2.05 | 24.5 | 0.06 |

Figure 3C:
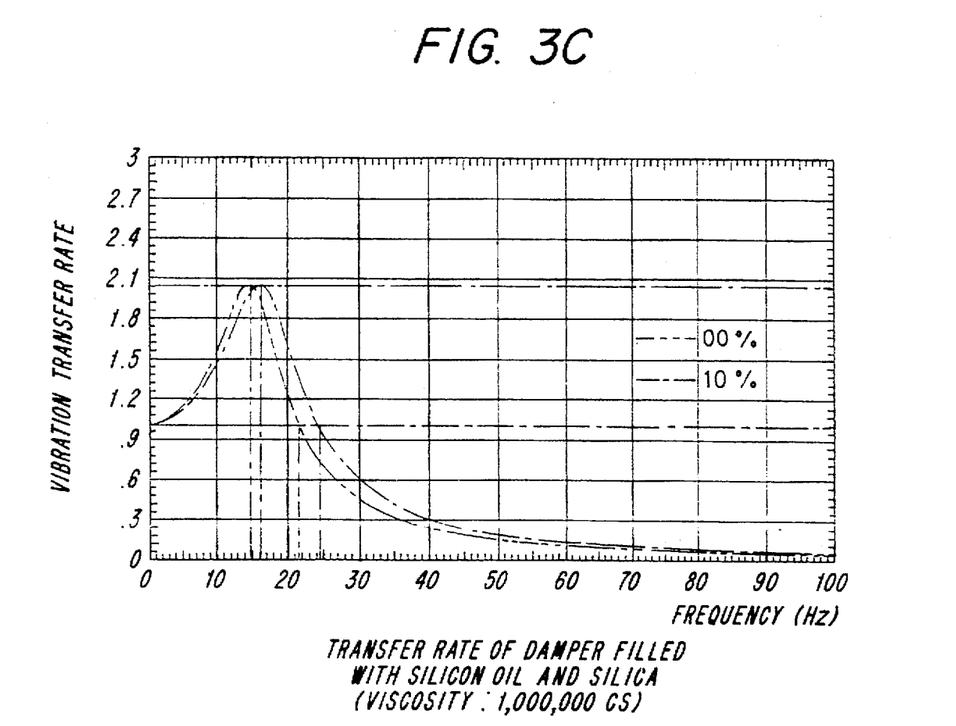

FIG. 3C is a graph according to the result of the above experiment.

As described above, when the damper is filled with a mixture of silicone oil of 100,000 CS in viscosity and silica as a viscous fluid (Experiment No. 1), the peak value of the vibration transfer rate can be reduced.

Accordingly, it is to be understood that the invention can result in the output of finer sound because the Q value is reduced in the resonance band.

Embodiment No. 2

In the vibration attenuation apparatus of the optical disc player according to the second embodiment, the damper is filled with a mixture of silicone oil and synthetic hydrated silica as the viscous fluid.

Only silicone oil having a viscosity below 500,000 CS is used; the synthetic hydrated silica is obtained by precipitation.

A size of the powder of synthetic hydrated silica is 10–30 μm, the surface area of the powder particles is 140–170 m/g.

Fourth Embodiment

The mixing rate of silicone oil and synthetic hydrated silica is 95-70 weight % to 5–30 weight % respectively.

Viscosity of the silicone oil is 100,000 CS, and the mixing ratio of silicone oil and synthetic hydrated silica is 100-85 weight % to 0–15 weight % respectively.

That is, the mixing ratio of synthetic hydrated silica is successively 0 weight %, 10 weight % and 15 weight % under the condition of silicone oil of 100,000 CS being in viscosity.

As a result of that, it can be understood that the peak value of the vibration transfer rate in case of silicone oil and synthetic hydrated silica mixture in the damper is lower than that in case of with only silicone oil in the damper, as listed in table 4.

TABLE 3

| viscosity of silicone oil (CS) | mixing ratio of synthetic hydrated silica (%) | frequency at peak value (Hz) | peak value of vibration transfer rate | frequency of vibration transfer rate of 1 (Hz) | vibration transfer rate at 100 Hz |
|---|---|---|---|---|---|
| 100,000 | 0 | 10.0 | 1.81 | 15.5 | 0.04 |
| 100,000 | 10 | 12.0 | 1.49 | 18.0 | 0.07 |
| 100,000 | 15 | 15.0 | 1.44 | 22.5 | 0.07 |

Figure 4A:
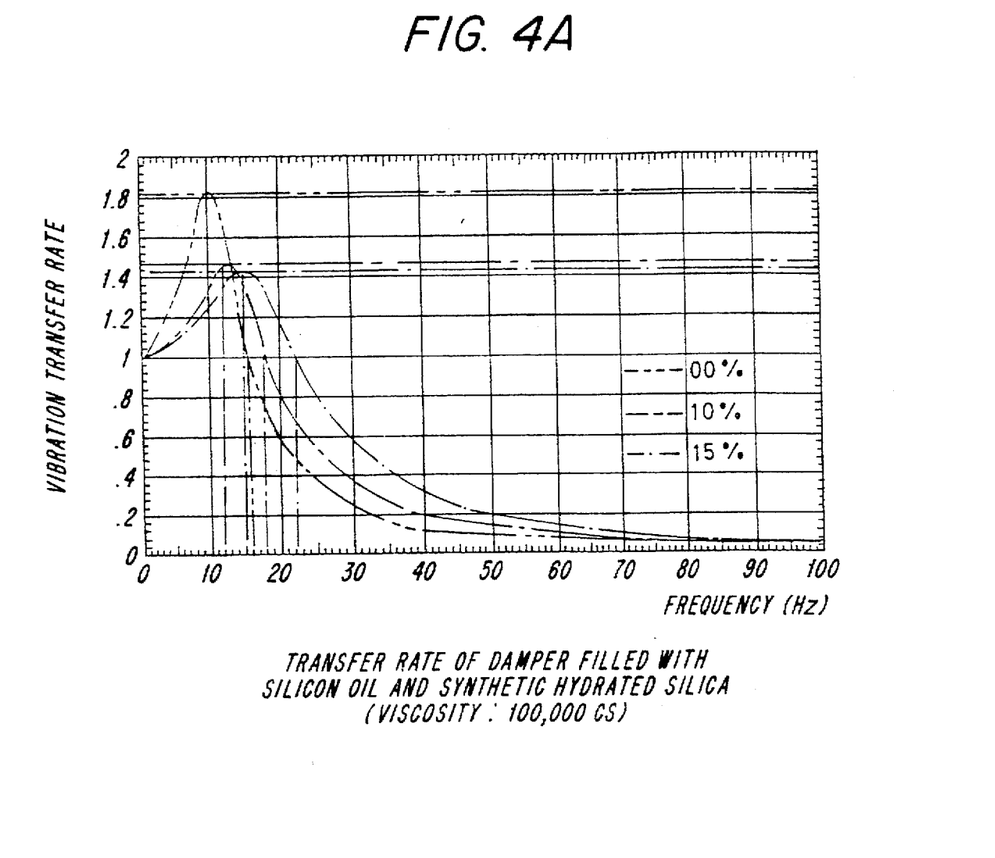
FIGS. 4A to 4D are graph illustrating the relationship between a frequency and a vibration transfer rate according to the other embodiment of the present invention.

FIG. 4A is a graph according to the result of the experiment.

As described above, it can be understood that the peak value of the vibration transfer rate is lowest when the mixing ratio of synthetic hydrated silica is 15 weight %.

Fifth and Sixth Embodiments

Accordingly, the viscosity of silicon oil is now changed under the condition of a mixing ratio of 15 weight % for synthetic hydrated silica.

Tables 5 and 6 set forth the results of the fifth and sixth experiments.

TABLE 5

| viscosity of silicone oil (CS) | mixing ratio of synthetic hydrated silica (%) | frequency at peak value (Hz) | peak value of vibration transfer rate | frequency of vibration transfer rate of 1 (Hz) | vibration transfer rate at 100 Hz |
|---|---|---|---|---|---|
| 60,000 | 15 | 14.0 | 1.45 | 21.5 | 0.07 |

TABLE 6

| viscosity of silicone oil (CS) | mixing ratio of synthetic hydrated silica (%) | frequency at peak value (Hz) | peak value of vibration transfer rate | frequency of vibration transfer rate of 1 (Hz) | vibration transfer rate at 100 Hz |
|---|---|---|---|---|---|
| 200,000 | 15 | 15.5 | 1.50 | 22.5 | 0.07 |

Figure 4B:
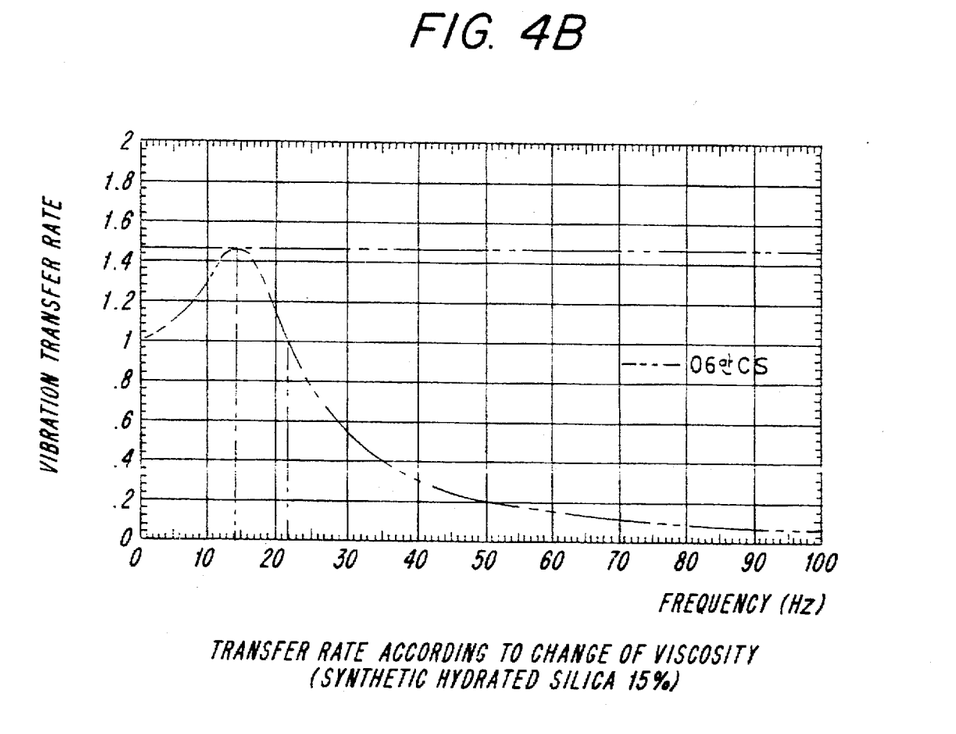
Figure 4C:
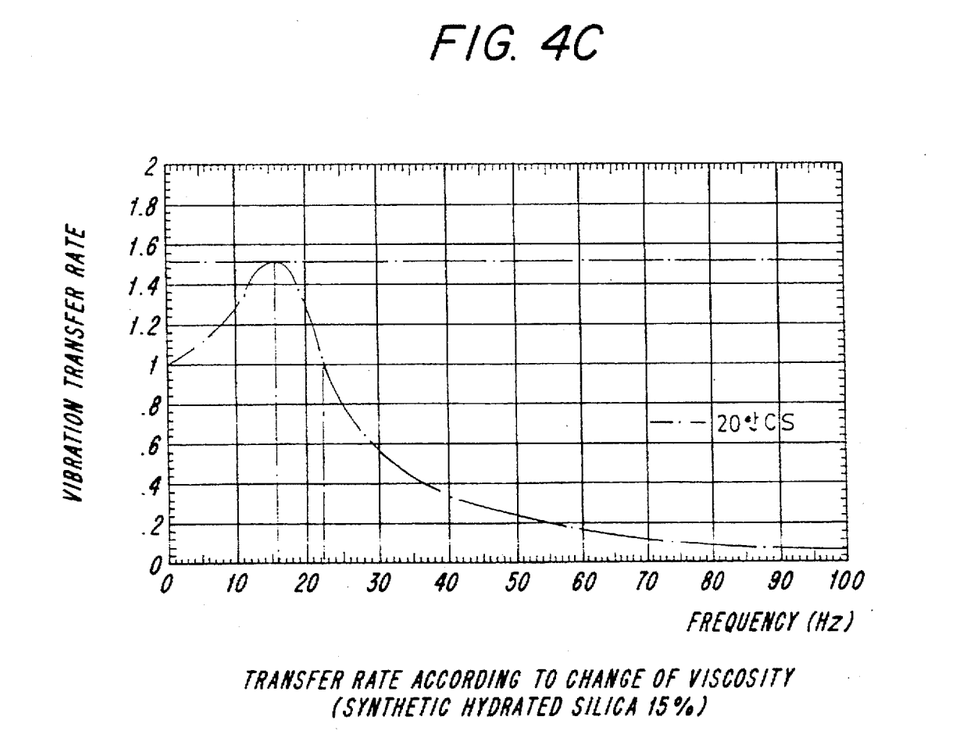

FIGS. 4B and 4C are graphs according to the result of the experiments.

Seventh Experiment

Next, the viscosity of silicone oil is 500,000 CS, and the mixing ratio of silicone oil and synthetic hydrated silica is 100-70 weight % to 0–30 weight %, respectively.

The mixing ratio of synthetic hydrated silica is successively 0 weight %, 20 weight % and 30 weight %.

As a result of that, peak value of the vibration transfer rate in case of silicone oil and synthetic hydrated silica mixture in the damper is higher than that in case of only silicone oil in the damper, as listed in table 7.

TABLE 7

| viscosity of silicone oil (CS) | mixing ratio of synthetic hydrated silica (%) | frequency at peak value (Hz) | peak value of vibration transfer rate | frequency of vibration transfer rate of 1 (Hz) | vibration transfer rate at 100 Hz |
|---|---|---|---|---|---|
| 500,000 | 0 | 13.5 | 1.95 | 18.5 | 0.04 |
| 500,000 | 20 | 19 | 1.96 | 29.5 | 0.09 |
| 500,000 | 30 | 20.5 | 2.12 | 31 | 0.09 |

Figure 4D:
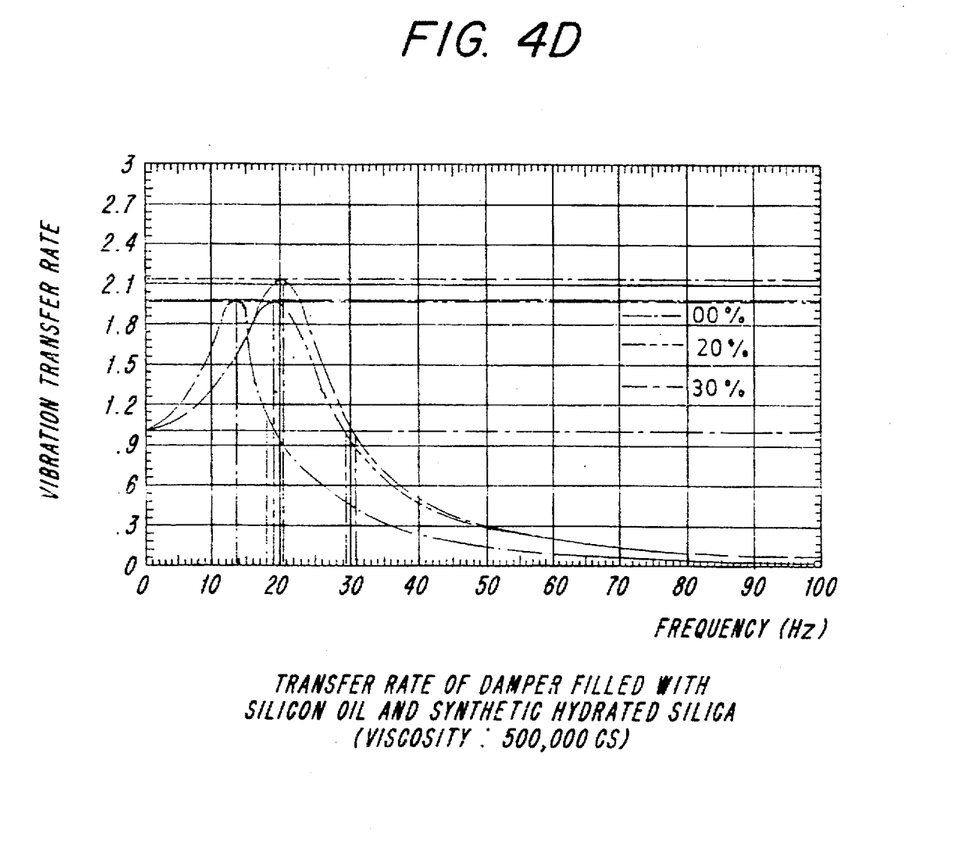

FIG. 4D is a graph according to the result of the experiment.

III. Conclusions from Experiments

Having described specific preferred embodiments of the invention with reference to the accompanying drawings, it is to be understood that the vibration attenuation apparatus of the optical disc player according to the present invention can reduce vibration in the lower frequency band by a damper filled with a mixture of silicone oil of predetermined viscosity and either silica or synthetic hydrated silica in powder form, to output fine sound.

It is to be understood that the invention is not limited to these precise embodiments, and that various changes and modifications may be effected therein by one skilled in the art without departing from the scope or spirit of the invention as defined in the appended claims.

What is claimed:

1. An automobile optical disc player comprising:

a frame;

a chassis mounted to said frame;

an optical disc playing mechanism mounted to said chassis; and a vibration attenuating mechanism including a pair of relatively movable members connected to said frame and chassis, respectively, one of said members forming a chamber filled with a viscous fluid which dampens relative movement between said members;

said viscous fluid being a mixture of silicone oil and silica, said silicone oil having a viscosity of about 100,000 centistokes and being about 85% of the weight of the mixture; and the silica being a synthetic hydrated silica having a viscosity in the range of 50,000 to 150,000 centistokes and being about 15% of the mixture weight.

* * * * *